United States Patent [19]
Suh et al.

[11] Patent Number: 5,486,645
[45] Date of Patent: Jan. 23, 1996

[54] MUSICAL MEDLEY FUNCTION CONTROLLING METHOD IN A TELEVISON WITH A VIDEO/ACCOMPANIMENT-MUSIC PLAYER

[75] Inventors: Jung S. Suh; Sang S. Lee, both of Suwon, Rep. of Korea

[73] Assignee: Samsung Electronics Co., Ltd., Kyungki-Do, Rep. of Korea

[21] Appl. No.: 268,942

[22] Filed: Jun. 30, 1994

[30] Foreign Application Priority Data

Jun. 30, 1993 [KR] Rep. of Korea ............... 93-12407

[51] Int. Cl.⁶ ............... G09B 15/04; G10H 1/36; H04N 5/76
[52] U.S. Cl. ............... 84/610; 84/634; 84/477 R; 84/DIG. 6; 358/335
[58] Field of Search ............... 84/601, 602, 609–614, 84/634–638, 477 R, 478, DIG. 6; 358/342, 343, 335, 341

[56] References Cited

U.S. PATENT DOCUMENTS

5,245,600  9/1993  Yamauchi et al. ............... 358/343 X

*Primary Examiner*—Stanley J. Witkowski
*Attorney, Agent, or Firm*—Sughrue, Mion, Zinn, Macpeak & Seas

[57] ABSTRACT

A television with a karaoke player has a video function accompanied with music to which a medley function for classifying songs of the same form or theme and successively playing the classified songs by gathering them is added. According to a method for controlling the medley function, a microcomputer controls a display of thematic items of songs in response to a user's selection of the medley function. Upon selection of a thematic item, formational items of the songs are displayed. Songs falling in the selected categories are then played in order.

2 Claims, 6 Drawing Sheets

\* THEMATIC ITEMS OF SONGS

1. POPULAR SONG
2. FOLK SONG
3. ARIA
4. CHILDREN'S SONG
5. MARTIAL SONG

FIG.4B

\* FORMATIONAL ITEMS OF SONGS

1. TROT
2. DISCO
3. GOGO
4. RAP
5. BALLAD

MUSICAL MEDLEY FUNCTION CONTROLLING METHOD IN A TELEVISON WITH A VIDEO/ACCOMPANIMENT-MUSIC PLAYER

BACKGROUND OF THE INVENTION

1. Field of the Invention

The present invention relates to a method for controlling a musical medley function in a television having a karaoke player incorporated therewith, and more particularly to a method for controlling a musical medley function wherein the songs are classified into a thematic category and a formational category, the user may choose one theme and one style from the respective categories, and the songs with background video, words, and accompaniment music are played one after another.

Korean Patent Application No. 93-12407 is incorporated herein by reference for all purposes.

2. Description of the Prior Art

Generally, television receivers are provided with an external signal input terminal for receiving video signals and audio signals from external sources. Examples of such external sources include a video cassette recorder, camcorder, or karaoke player, and the signals supplied from the external source can be monitored through a cathode ray tube (CRT) and speakers. The user selects between the television signal or the video and/or audio signals received via the external signal input terminal by manipulating an operation button installed on the television receiver or remote controller. The selected signal is provided to the CRT and the speakers in the ordinary manner.

A karaoke player is an apparatus provided with a television monitor for displaying words, accompaniment-music, background video scenes, and allows the user to input his or her own voice mixed with the accompaniment-music. There are several categories of karaoke players, including an LD player system using a laser disc player, a CDG player system using a compact disc graphic player, and a computerized player system using a memory.

The LD player system has the best video and sound quality of all the karaoke systems, but the number of songs recorded on a single disc is restricted to about thirty songs. Thus, a disc exchanging apparatus, such as a jukebox, is required to play a lot of songs in an LD player system.

Although a CDG player system provides excellent sound quality similar to that of the laser disc system, it provides only limited number of still image information recorded on a sub-code channel of the compact disc, so that the picture and music are barely interrelated to each other. Moreover, the number of songs recorded on a compact disc is limited to about fifteen, thereby also requiring a disc exchanging apparatus to play a large number of songs.

A computerized player system does not provide sound quality on a par with the laser disc or compact disc player systems. However, a computerized system has the advantage that accompaniment-music and word information of about 1,000 to 1,500 songs are provided, and music selection can be carried out at a high speed. A computerized player system will be briefly described with reference to FIG. 1.

Figure 1:
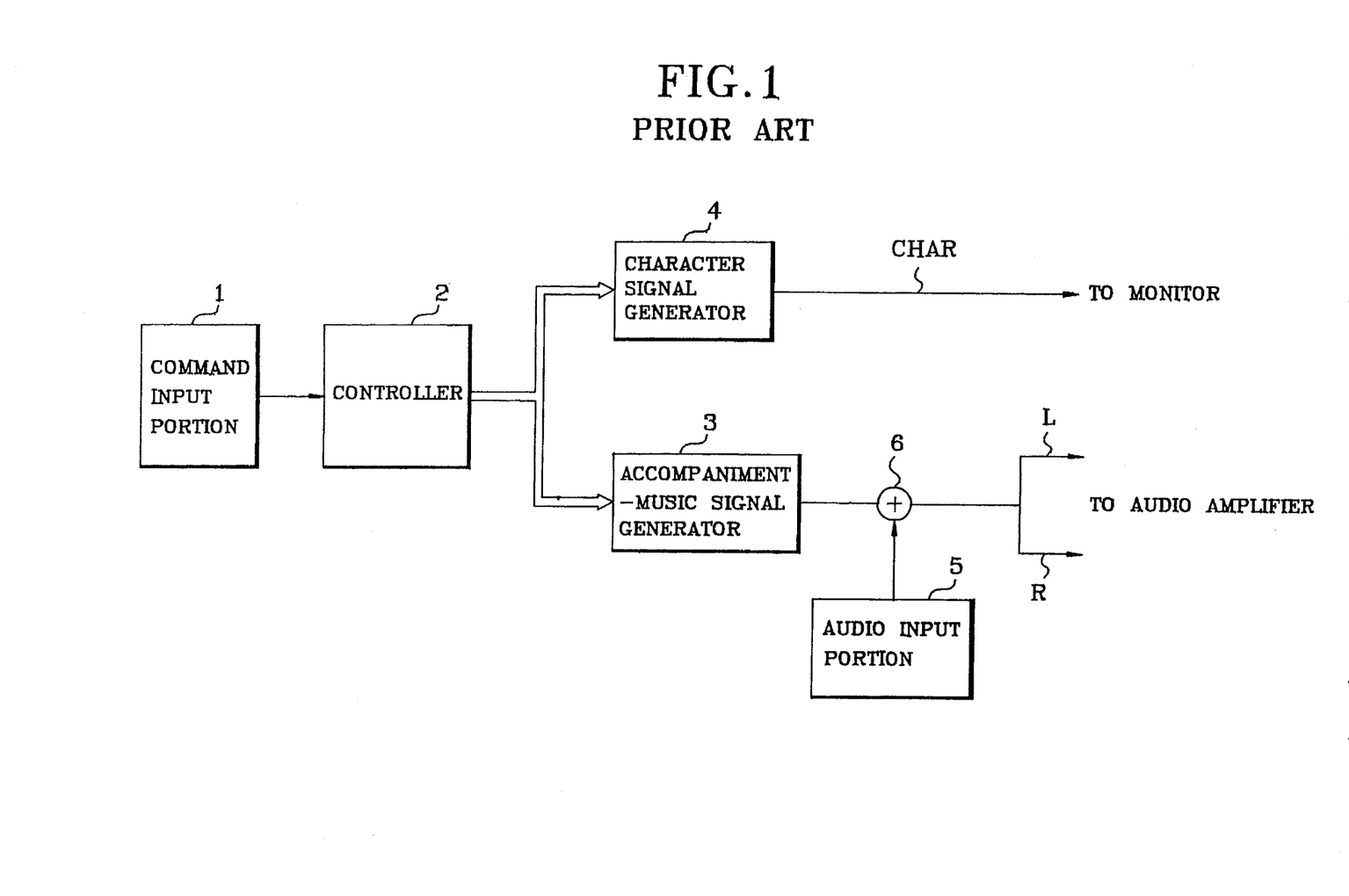
FIG. 1 is a schematic block diagram showing a prior art computerized karaoke player.

FIG. 1 is a schematic block diagram of a computerized karaoke player, which uses a memory, is connected to a general video monitor and audio amplifier, and provides a stereophonic accompaniment-music signal and word information. When a specific song is selected by a command input portion 1 and an accompaniment-music start signal is received, a controller 2 controls an accompaniment-music signal generator 3 to generate the accompaniment-music signal for the designated song. At the same time, the controller 2 controls a character signal generator 4 to generate the word information for the designated song.

An audio signal, such as one representing the users voice, is received through an audio input portion 5, mixed with the accompaniment-music signal in a mixer 6 and supplied to the audio amplifier via an audio output terminal. Also, an output from the character signal generator 4 is supplied to the monitor to allow the user to sing the selected song in time with and in tune with the accompaniment music.

However, the above-described computerized karaoke player requires a separate monitor for effectively monitoring the accompaniment-music signal and word signal, and an amplifier is also required. In other words, the user must purchase at least two kinds of apparatus. Furthermore, since the computerized karaoke player system has its own command input portion, the user separately manipulates the television receiver along with the manipulation of the karaoke player system, resulting in inconvenience when using it.

In order to solve the inconvenience due to the separated computerized karaoke player system and the television receiver, it has been proposed that the computerized karaoke player be accommodated in the television set by including the video/accompaniment-music signal generating portion, thereby allowing the output of the karaoke player system to be processed and output to the conventional television monitor and the amplifier.

However, the above proposed device still has the disadvantage that the menu provided to the user for his selection cannot be varied and, therefore, the present invention is directed to a method for providing a more varied menu to the user through the television set accommodating the computerized karaoke player system.

SUMMARY OF THE INVENTION

The present invention is devised to solve the above-described problems. Accordingly, it is an object of the present invention to provide a method for controlling a musical medley function in a television having a karaoke player incorporated therewith, wherein the medley function is added to a video function accompanied with music to promote user's interests, and the selectable menu of songs ranges over various fields.

To achieve the above object of the present invention, there is provided a method for controlling a musical medley function in a television incorporated with a karaoke player including the steps of: displaying thematic items when a medley function key is actuated; confirming an input of a numerical key for selecting any one of several displayed thematic items, determining a number of the numerical key input, and displaying classified items per form of a song corresponding to the selected numerical key; determining a number of the numerical key for selecting any one among the displayed form items, and displaying the title of a first song corresponding to the selected numerical key; and successively playing all songs from the first to the last song when a start key is received.

BRIEF DESCRIPTION OF THE DRAWINGS

The above objects and other advantages of the present invention will become more apparent from the following detailed description of preferred embodiments thereof with reference to the attached drawings in which.

DETAILED DESCRIPTION OF THE PREFERRED EMBODIMENT

Figure 2:
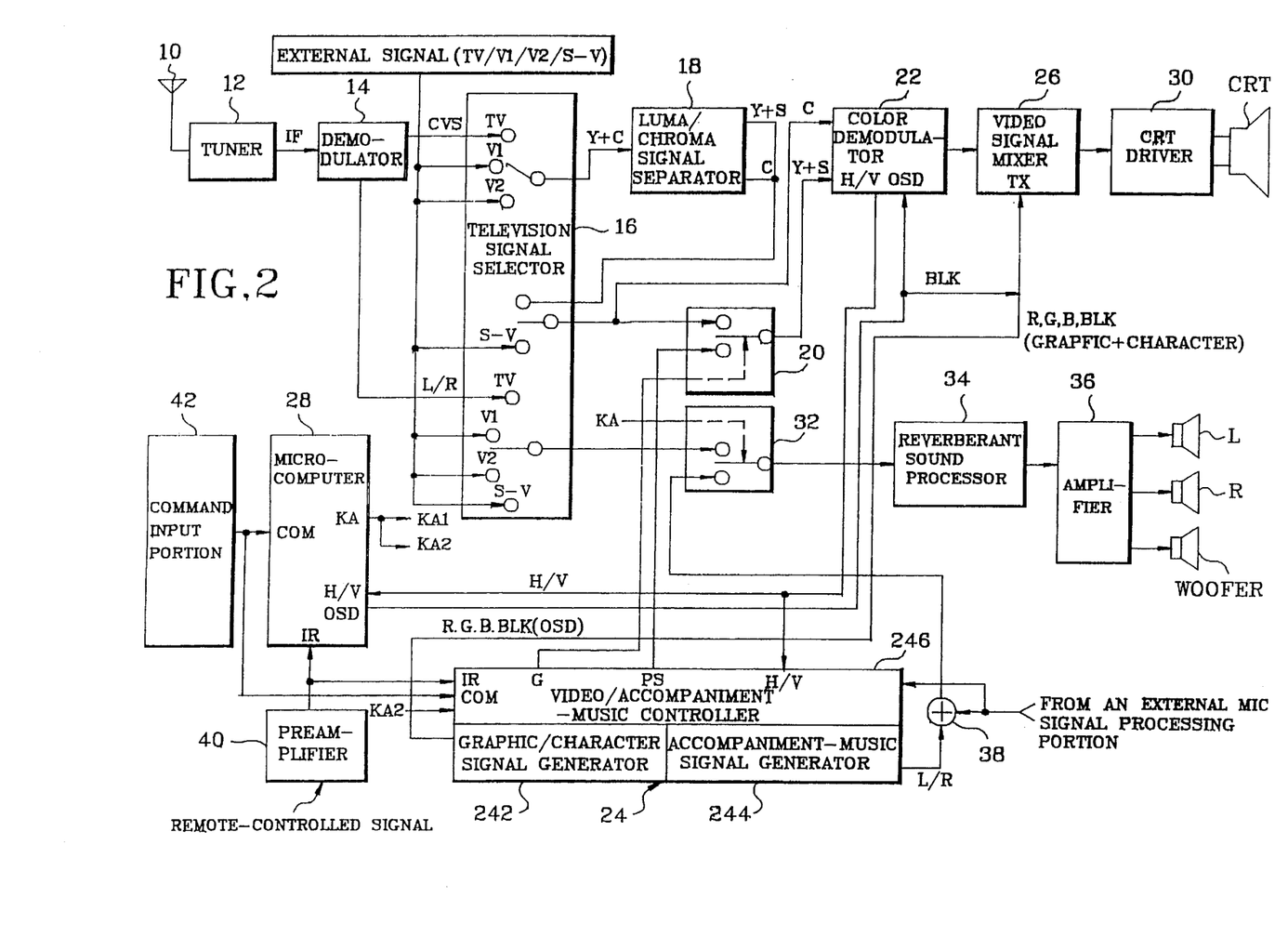
FIG. 2 is a schematic block diagram showing a television incorporated with a karaoke player according to the present invention.

Referring to FIG. 2, which schematically shows a television incorporated with a karaoke player, the television is divided broadly into a video-related system and audio-related system. In considering the operation of the system as a television and as a karaoke system, the functions for overall control of control terminals, such as channel selection, video selection, and volume adjustment, are carried out. Also, in connection with the operation as a karaoke player, the functions, including the selection of a song, tune and speed control, and preprogramming reservation, are carried out.

In a video mode accompanied with music, an audio signal is supplied only by means of the karaoke player, but a video signal may be supplied by a broadcasting signal from a selected channel, by an externally supplied signal, or by a graphic signal from a video/accompaniment-music signal generating portion to supply a live picture corresponding to the content of a song.

Referring to FIG. 2, a tuner 12 converts a broadcast signal, which is a radio frequency (RF) signal received via an antenna 10, into an intermediate frequency (IF) signal which is applied to a demodulator 14. The demodulator 14 demodulates the IF signal from the tuner 12 by separating the signal into a composite video signal CVS and L/R audio signals and applies these signals to a television signal selector 16. The television signal selector 16 also receives externally supplied signals, i.e., signals V1 and V2 from first and second video signal sources (not shown) and a signal S–V from a super VHS signal source (not shown).

The television signal selector 16 selects any one of the received plurality of video signals, CVS, V1, V2, or SVHS, and supplies the selected signal to a luma/chroma signal separator 18, which separates the selected video signal into a luma signal Y+S, having a composite sync signal, and a chroma signal C. The luma signal Y+S is supplied to one input terminal of a first selector 20, and the chroma signal C is supplied to a color demodulator 22. The other input terminal of the first selector 20 is supplied with a pseudo sync signal PS generated from a video/accompaniment-music signal generating portion 24. The signal Y+S or PS selected by the first selector 20 is supplied to the color demodulator 22.

On the other hand, if the super VHS signal S–V is selected in the television signal selector 16, the super VHS signal S–V is directly supplied to the color demodulator 22 and the first selector 20 without passing through the luma/chroma signal separator 18.

The first selector 20 is controlled by a graphic mode signal G generated from the video/accompaniment-music signal generating portion 24. Here, when the graphic mode signal G is in a "high" state, the pseudo sync signal PS supplied from the video/accompaniment-music signal generating portion 24 is selected as an output, while the video signal supplied from the television signal selector 16 is selected in case of a "low" state of the graphic mode signal G.

The chroma signal C and luma signal Y+S having the composite sync signal supplied to the color demodulator 22 are demodulated as color difference signals R-Y, B-Y, G-Y, -Y to be supplied to a video signal mixer 26. A sync signal H/V detected from the luma signal Y+S having the composite sync signal is supplied to the video/accompaniment-music signal generating portion 24 and a microcomputer 28.

An on-screen display (hereinafter simply referred to as "OSD") signal supplied from the microcomputer 28 to the color demodulator 22 is mixed with the demodulated color difference signal to be supplied to the video signal mixer 26.

Another input of the video signal mixer 26 is supplied with the graphic signal and character signal from the video/accompaniment-music signal generating portion 24 in the form of R,G,B and BLK to be mixed with the color difference signal from the color demodulator 22, and the result of the mixing is supplied to a cathode ray tube (CRT) drive 30. The video signal mixer 26 is provided with a blanking signal BLK_OSD from the microcomputer 28 and a blanking signal BLK from the video/accompaniment-music signal generating portion 24. By the output of these signals BLK OSD, BLK, the signals are set in the order of the OSD signal from the microcomputer 28, the graphic signal and character signal from the video/accompaniment-music signal generating portion 24, and then the signal from the television signal selector 16.

In the audio-related system, an audio signal TV, V1, V2 or S–V selected by the television signal selector 16 is supplied to a second selector 32. When a television mode is selected by the microcomputer 28, the second selector 32 selects the audio signal supplied from the television signal selector 16. Whereas, when a video mode accompanied with music is selected, the second selector 32 selects the accompaniment-music signal supplied from the video/accompaniment-music-signal generating portion 24 to output the selected signal to an audio output apparatus. In more detail, the signal from the second selector 32 is supplied to a reverberant sound processor 34 to be subjected to reverberant sound processing and equalization, and then is supplied to an amplifier 36. The signal amplified in the amplifier 36 is provided as an audio output by speakers L, R and woofer.

An audio mixer 38 mixes a voice received through a microphone with the accompaniment-music signal from the video/accompaniment-music signal generating portion 24 to supply the result to the second selector 32.

The video/accompaniment-music signal generating portion 24 includes a graphic/character signal generator 242 for generating the graphic/character signal, and an accompaniment-music signal generator 244 for generating accompaniment music. Furthermore, a karaoke controller 246 controls the graphic/character signal generator 242 and accompaniment-music signal generator 244, and generates a pseudo sync signal, and an external interface (not shown) receives externally available graphic/character information and sound source information to supply the input to the graphic/character signal generator 242 and the accompaniment-music signal generator 244.

The graphic/character signal generator 242 has unshown constituents, such as a graphic memory, for storing graphic information, a character memory for storing character information, a graphic/character processor for combining the graphic information from the graphic memory with the character information read out from the character memory, and a digital-to-analog converter for processing an output of the graphic/character processor via a digital-to-analog conversion and then outputting the result of the conversion.

The accompaniment-music signal generator 244 has unshown constituents, such as a sound source memory, for storing sound source information, a sound source information processor for receiving the sound source information read out from the sound source memory and converting the received sound source information into the accompaniment-music signal, and a digital-to-analog converter for converting an output signal of the sound source information processor to output the result. Here, the sound source information stored on the sound source memory is MIDI-information.

Meanwhile, the karaoke controller 246 has unshown constituents including a processor for controlling the graphic/character signal generator 242 by performing an inherent program. In addition to the processor, an interface performs a remotely-controlled command from a remote controller (refer to FIG. 5A) or directly-controlled command from a built-in command input portion (refer to FIG. 5B) and supplies the command to the processor, and a sync signal generator generates a pseudo sync signal which is the same as the sync signal of the television signal.

Figure 5A:
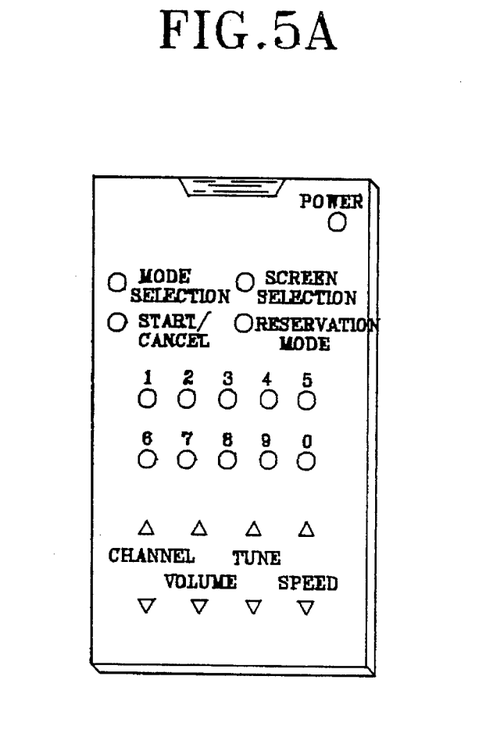
FIG. 5A is a front view showing a remote controller for use with the present invention.
Figure 5B:
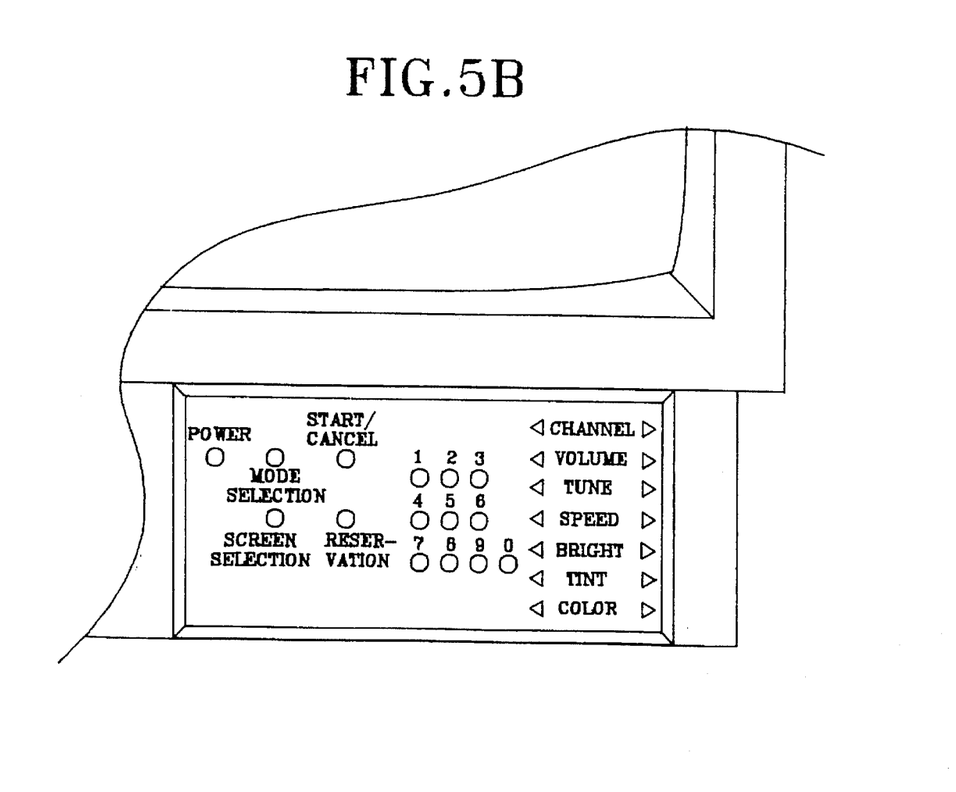
FIG. 5B is a partially cut-away front view showing a built-in command input portion of a television for use with the present invention.

A preamplifier 40 interfaces the control command supplied from the remote controller shown in FIG. 5A to the microcomputer 28. As shown in FIG. 5B, the command input portion 42 is provided on the television set. Both the remote controller of FIG. 5A and the command input portion of FIG. 5B include similar control buttons or keys, such as a mode selection key for selecting either the television mode or the video mode accompanied with music, a screen selection key for selecting the video signal to be displayed along with the accompaniment music, a numerical pad for selecting a song, a start/cancel key, a reservation key, a tune adjustment key, and a speed-control key. Such a karaoke player is integrally formed within the television for convenience of the user.

Figure 3A:
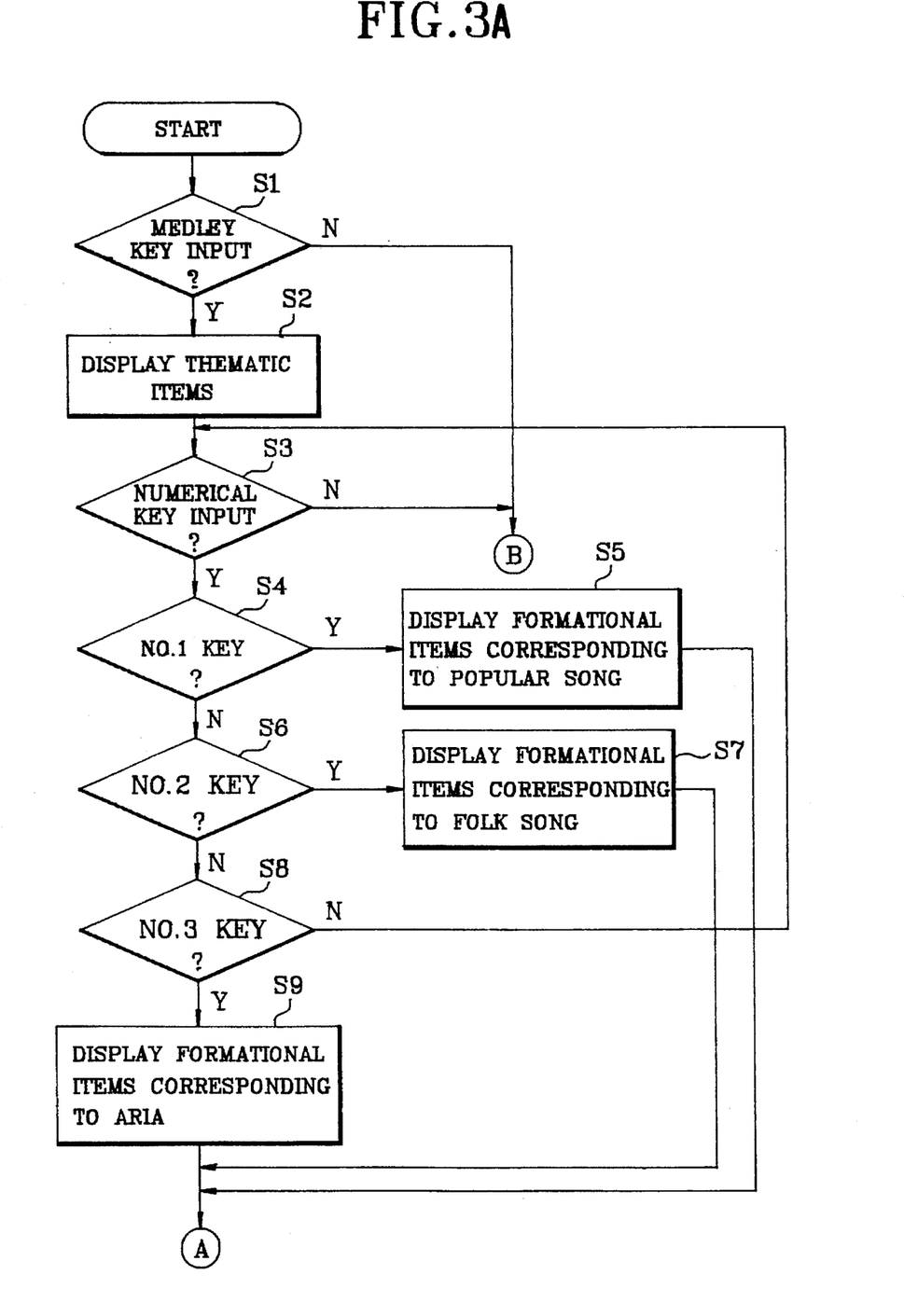
FIGS. 3A and 3B, taken together, is a flow chart of the process for performing a medley function in a television incorporated with a karaoke player according to the present invention.
Figure 3B:
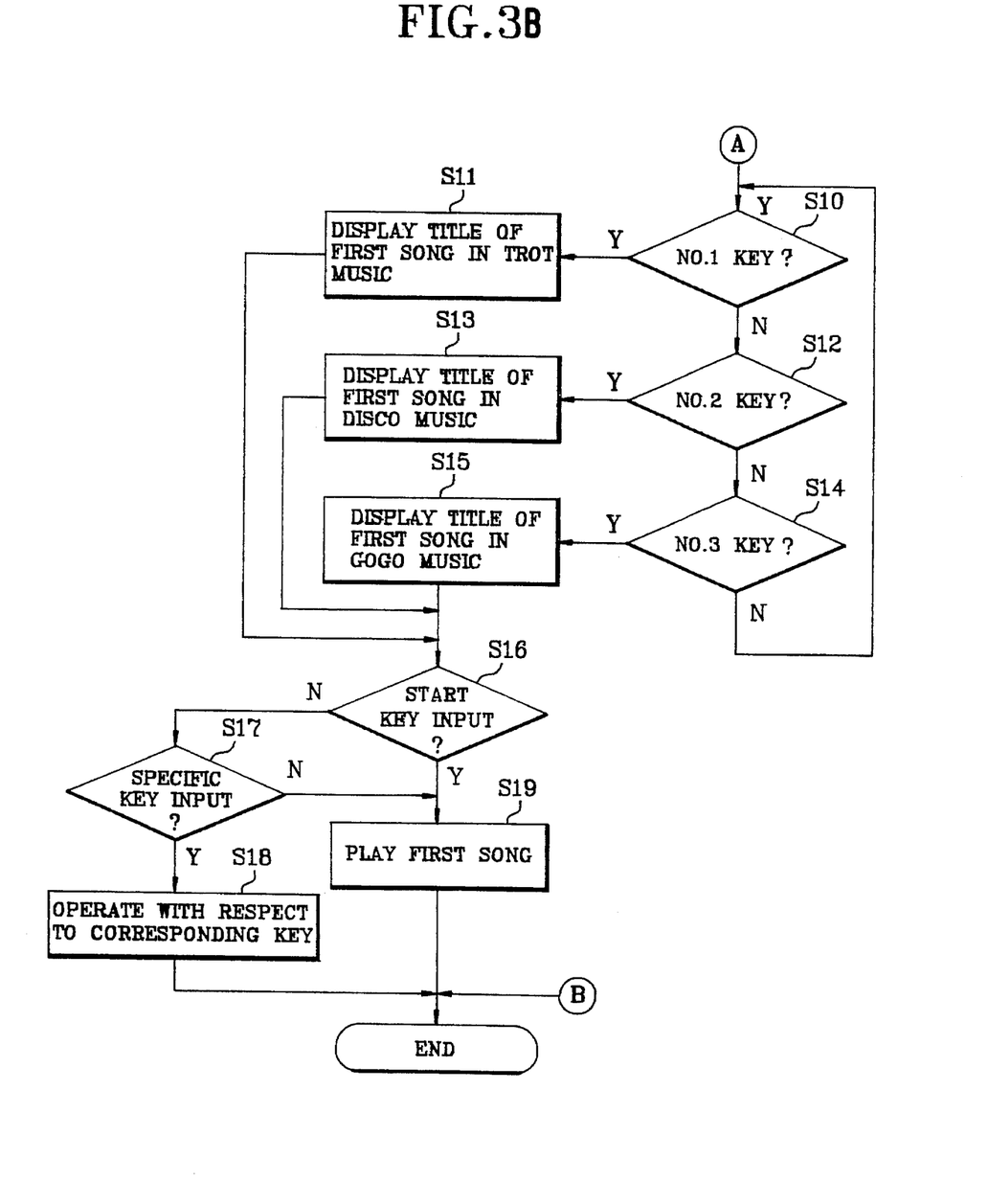

The method of performing the medley function in the television incorporated with the karaoke player according to the present invention will be described with reference to FIGS. 3A and 3B. The microcomputer 28 determines whether the medley function is selected or not (S1). In the example described it is assumed that the songs available are grouped in two categories of thematic item (or theme) and formational item (or style). For example, referring to FIGS. 4A and 4B, song themes may include popular songs, folk songs, operatic arias, etc. Song styles may include fox trot, disco, gogo, etc. In the method of the present invention, the themes and the styles are provided to the display and the operator selects one of each. In the specific example disclosed herein, when the medley function is chosen, the screen of the TV displays the list of themes. The operator selects a theme, and the system then displays those styles applicable for the selected theme. The operator then selects a preferred style. Thereafter, the songs which fall o in the category of selected theme and selected style are provided for playing.

Figure 4A:
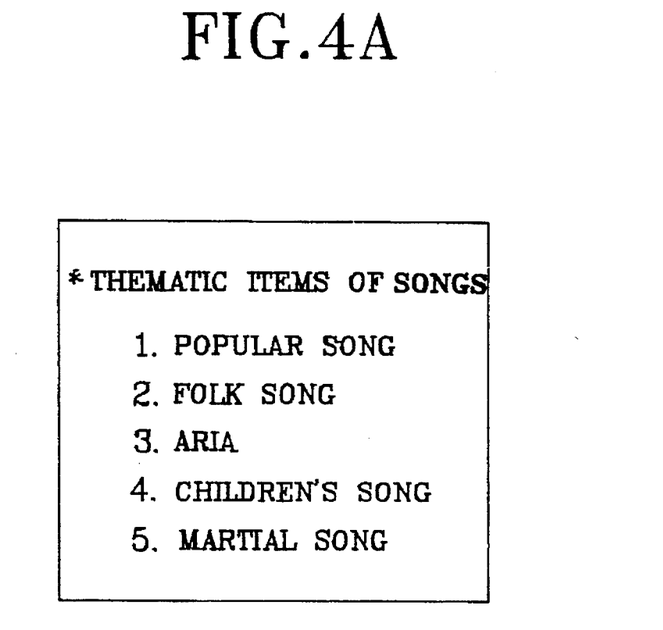
FIGS. 4A and 4B show the characteristic part of the screen displayed in accordance with FIGS. 3A and 3B.

If the medley function is determined to be selected, the microcomputer 28 controls the video/accompaniment-music signal generating portion 24 to output initial screen information which is in turn supplied to the CRT to be displayed (S2). The initial screen information includes a list of themes or thematic items for groups of songs. For example, as shown in FIG. 4A, the initial screen information includes a No. 1 group corresponding to popular songs, a second group corresponding to folk songs, a third group corresponding to arias, etc.

The user then selects a theme and actuates the numerical key on the remote controller (shown in FIG. 5A) or on the command input portion (shown in FIG. 5B) corresponding to the selected theme. A control signal corresponding to the selected numerical key is supplied to the microcomputer 28 via the preamplifier 40 in case of using the remote controller or supplied directly to the microcomputer 28 in case of manipulating the command input portion 42. The microcomputer 28 determines whether the selected numerical key is received or not (S3). In step S3, if it is determined that a numerical key input has been received, the microcomputer 28 determines a number corresponding to the numerical key which has been actuated. (See steps S4, S6, and S8.)

When the number corresponding to the numerical key is determined, the microcomputer 28 searches formational lists of the songs suitable for the selected theme, and outputs a control signal to the video/accompaniment-music signal generating portion 24 to display the classified formational items of the searched song theme on the CRT (S5, S7, S9). For example, if popular songs is the theme selected in step S5, the microcomputer 28 controls information causing the display of a list shown in FIG. 4B. This list includes the formational items, or in this case types of music styles, that have songs according to the selected theme. For example, popular songs may be in the fox trot style (item 1.), the disco style (item 2.), the gogo style (item 3.), etc. This information is supplied by the video/accompaniment-music signal generating portion 24 to the CRT and displayed on the screen.

The user selects a formational item, or style, by actuating a corresponding numerical key on the key pad of the remote controller or the command input portion. A control signal corresponding to the actuated numerical key is supplied to the microcomputer 28, which detects the control signal to determine the number of the numerical key input. (See steps S10, S12, and S14.) It will be appreciated that although the method of FIGS. 3A and 3B includes steps for the case where there are only three thematic items and three formational items, the number of thematic items and formational items may be larger than three. For, example, the number of each is five in FIGS. 4A and 4B. Further, it will be apparent that the number of formational items need not be the same as the number of thematic items, and in fact will vary depending upon the particular thematic item chosen.

After determining the formational item selected by confirming the number of the numerical key received by the user's input, the microcomputer 28 supplies a control signal to the video/accompaniment-music signal generating portion 24, thereby controlling the video/accompaniment-music signal generating portion 24 to cause a display of the title of the first song among the group of songs that corresponds to the selected theme and the selected style.

The microcomputer 28 next determines whether a performance start command has been received or not (S16). A performance start command is received if the user actuates the start key on the remote controller or the command unit. If a start command is not received, the microcomputer 28 determines whether or not a specific key has been actuated by the user (S17). If a specific key has been actuated, the microcomputer 28 outputs the control signal to carry out the corresponding command of the designated key, and cancels the medley function (S18).

If a performance start command is received, the microcomputer 28 supplies a control signal to the video/accompaniment-music signal generating portion 24, which in turn supplies word information, background picture information, and accompaniment-music information of the selected group of songs to the CRT and speakers L, R and woofer in the order from the first song. As a result, all of the songs falling in the group having the selected theme and the selected style will be played one after another. The microcomputer 28 supplies the control signal to the video/accompaniment-music signal generating portion 24 to automatically play the next song upon completing the performance of a piece of music (S19).

As a further example of the invention, when the user selects the medley function key on the key pads of the remote controller or command input portion, a control signal corresponding to the medley function key is supplied to the microcomputer 28, which in turn determines whether the medley function key is received or not. If the medley function key is received, the microcomputer 28 supplies a control signal to the video/accompaniment-music signal generating portion 24, which supplies the information about the thematic items of the music to the CRT, which then displays the list of themes as shown in FIG. 4A.

Figure 4B:
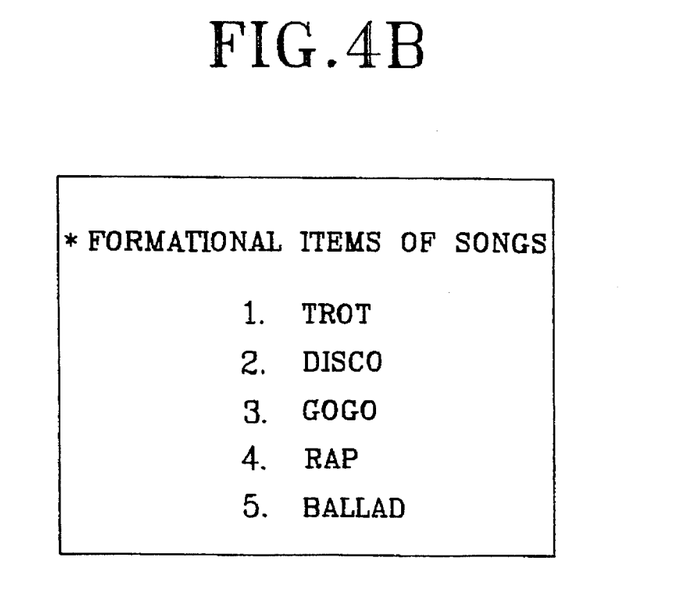

If the user presses key number one to select popular songs from among the thematic items displayed on the CRT, a control signal corresponding to key number one is supplied to the preamplifier 40 or the command input portion 42, and then is transmitted to the microcomputer 28. The microcomputer 28 supplies the control signal to the video/accompaniment-music signal generating portion 24. The video/accompaniment-music signal generation portion 24 outputs the information about the classified formational items of the songs, and the CRT displays the information as shown in FIG. 4B.

If the user selects the style "fox trot" by pressing key number, a control signal corresponding to key number one is supplied to the preamplifier 40 or the command input portion 42, and then transmitted to the microcomputer 28. The microcomputer 28 supplies the control signal to the video/accompaniment-music signal generating portion 24, which outputs the information about the title of the first popular music song with a fox trot style to the CRT, and the CRT displays the information from the video/accompaniment-music signal generating portion 24.

Thereafter, the microcomputer 28 determines whether the performance start key has been actuated or not. If so, the microcomputer 28 supplies a control signal to the video/accompaniment-music signal generating portion 24 to output the accompaniment-music signal of the corresponding song. The video signal from the video/accompaniment-music signal generating portion 24 is finally supplied to the CRT to display the background picture and word information corresponding m the first song, while the accompaniment-music signal is finally supplied to the speakers L, R and woofer to provide the accompaniment-music information of the first song.

At this time, when the first song is completely played, the microcomputer 28 supplies a control signal to the video/accompaniment-music signal generating portion 24 to successively play the second song. As a result, all of the songs gathered by being classified as popular songs of the fox trot style are played.

If the performance start key is not received, the microcomputer 28 determines whether a specific key designating a different type of operation has been actuated. If so, the medley function is cancelled, and the command responsive to the selected specific key is carried out.

According to the above method, a medley function is added to the video function in a television with karaoke player. The medley function permits the user to select themes and styles, and thereafter the songs having the selected theme and style are played one after another. It will be appreciated that although the two categories mentioned above are theme and style, the invention is not limited to these categories, but could include different categories for classifying music.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. In a television having a karaoke player incorporated therewith, and being of the type which, upon a selection of a song, provides background video scene related to the selected song, accompaniment music associated with the selected song, and words for display on said background, said words associated with said selected song; a method for providing a musical medley function, comprising:

actuating a medley function key;

detecting the actuation of said medley function key;

displaying on a monitor of said television a list of song themes, in response to detecting the actuation of said medley function key;

actuating a key to select one of said displayed themes;

detecting the actuation of a key corresponding to one of the displayed themes;

displaying a list of song styles associated with the selected theme;

actuating a key to select one of said displayed song styles;

detecting the actuation of a key corresponding to one of the displayed styles;

selecting from a memory of stored songs, those songs having the theme and style selected by the actuation of said keys;

playing said songs seriatim on said karaoke player by providing accompaniment music, words, and background scenes for each said song.

2. The method of claim 1, wherein the step of playing said songs includes:

displaying the title of a first song among said selected songs;

actuating a start key to start the playing of said songs; and successively playing all songs from the first to the last song selected when said start key is actuated.

* * * * *